UNITED STATES PATENT OFFICE.

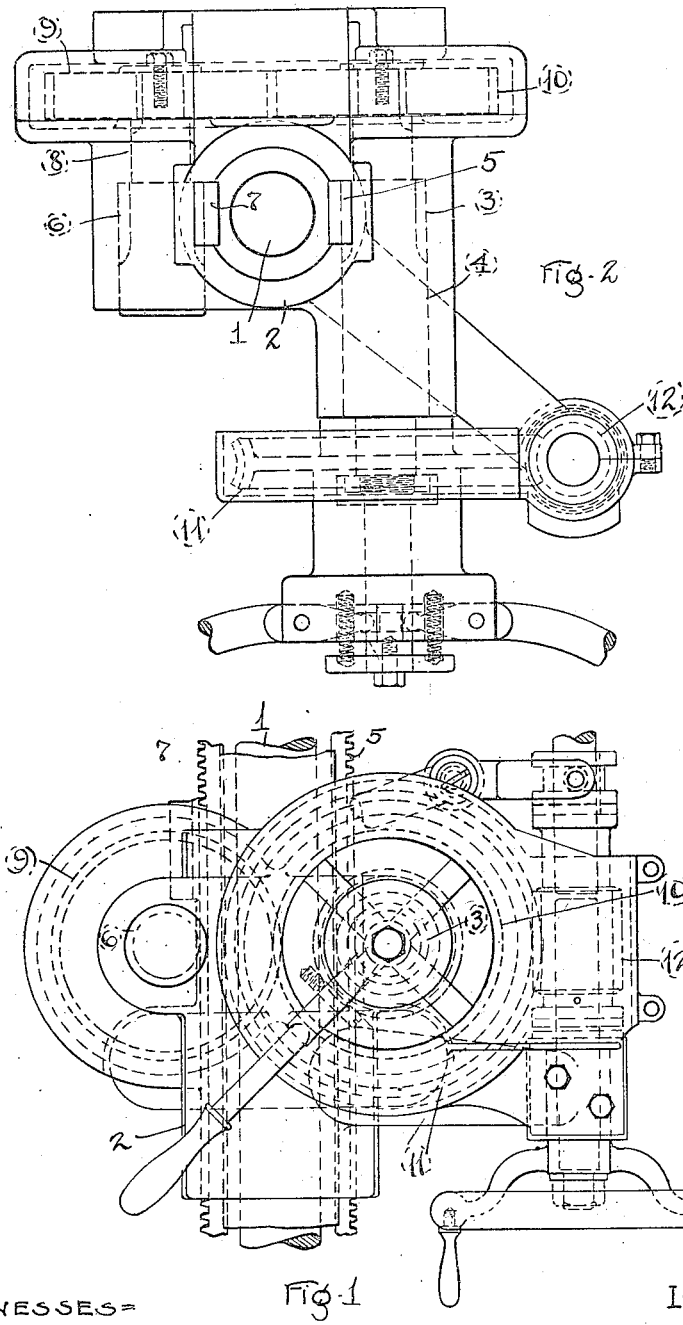

GEORGE E. RANDLES, OF CLEVELAND, OHIO, ASSIGNOR TO THE FOOTE-BURT COMPANY, OF CLEVELAND, OHIO, A CORPORATION OF OHIO.

DRILL-PRESS.

1,227,828. Specification of Letters Patent. Patented May 29, 1917.

Application filed August 29, 1916. Serial No. 117,409.

*To all whom it may concern:*

Be it known that I, GEORGE E. RANDLES, a citizen of the United States, and a resident of Cleveland, county of Cuyahoga, and State of Ohio, have invented a new and useful Improvement in Drill-Presses, of which the following is a specification, the principle of the invention being herein explained and the best mode in which I have contemplated applying that principle, so as to distinguish it from other inventions.

The present invention relates, as indicated, to a drill press, with more particular regard to the means for feeding the drill downward, the specific means here described having been designed to prevent the side play and wear and excessive friction which is common to the standard forms of mechanism, and which causes this part of the drill press to wear out very much more rapidly than any other part, and prevent continued and accurate work. To the accomplishment of the foregoing and related ends, then, the said invention consists of the means hereinafter fully described and particularly pointed out in the claims.

The annexed drawing and the following description set forth in detail certain mechanism embodying the invention, such disclosed means constituting, however, but one of various mechanical forms in which the principle of my invention may be used.

In said annexed drawing:—

Figure 1 is a front view of a portion of the drill press showing my invention embodied therein, and Fig. 2 is a plan view of the same portion.

The general features of the drill press have not been shown in the present drawings, and need not, of course, be described in detail, since drill presses are in quite common use and are of practically standard construction. In the present drawings I have shown a drill spindle 1 vertically reciprocable in a housing or gearing guide 2. The common way of feeding this drill spindle downward is by means of a pinion 3, suitably mounted on and attached to a shaft 4, this pinion engaging with a rack 5 on one side of the drill spindle sleeve, or a part of the same sleeve. The pinion 3 may be rotated by any suitable means to feed the drill spindle downward or upward, although the return movement is sometimes effected by other mechanism which operate independently by the worm and shaft.

In such a mechanism the driving gear is of small diameter with a small number of teeth, which naturally, with a standard form of gear tooth, weakens each tooth by reason of the undercutting at the root. To avoid this difficulty the teeth of such a gear are strengthened at the base by changing the form so that the base is broader and this form of tooth produces great lateral thrust and friction so that the other parts must be strengthened and enlarged proportionately. It will be evident, therefore, that in such a mechanism changing the form of the parts, or enlarging them for greater strength, really defeats its object by so increasing the friction and lateral thrust that excessive wear is caused on all the parts.

This means for feeding the drill spindle has been used for many years, but has never been entirely satisfactory, since all the lateral thrust exerted on the drill spindle was in one direction, and therefore tended to make this spindle bind against its bearings. As the bearings opposite to the driving worm became slightly worn, this binding action was increased and multiplied according to the length of the drill spindle. Furthermore, as the teeth of the rack 5 and the sides of the pinion became worn, the pressure exerted by the pinion against the teeth became more and more lateral in its direction and thus increased the side thrust of the spindle against its bearings and produced greater wear. By my invention I have overcome this defect in the common feeding mechanism for the spindle. I have accomplished this result by balancing the lateral thrust exerted by the worm, and the means used to secure this balance also serves to assist in the feeding action. In effect I have eliminated lateral thrust against one side of the bearing by thrusting equally on both sides of the spindle through the use of two opposed feeding means.

The means which I employ for feeding the drill spindle vertically, consist of the pinion 3 and rack 5, already described, and of an additional pinion 6 and rack 7 which are disposed diametrically opposite to the pinion 3 and rack 5, and are operated in unison therewith. Thus the rack 7 is set into the side of the drill spindle, the center of the rack 7 being alined with the center of the rack 5, and a central line through these two racks passing also through the center of the drill spindle. The pinion 6 is solid with a shaft 8 and the shafts 4 and 8 are interconnected by means of gears 9 and 10, respectively, the gear 10 being a driving gear, since the shaft 8 is operated through a worm gear 11 and worm 12, which is driven from some other suitable part of the machine.

The additional pinion 6 and rack 7 do much more than merely to assist in the feeding of the drill spindle downward, since they counter-balance the lateral pressure exerted against the drill spindle by the pinion 3, and maintain the drill spindle at all times exactly central in its bearings. These two pinions serve to "float" the spindle in its bearings and to assist in the absorption of shocks and lateral pressure. The wear on the bearings or guides 2 is therefore equal at all points and no looseness or play develops between the drill spindle and the bearings even after very long use. The present invention has been embodied in drill presses which have been used in the manufacture of shells, where the drill sometimes has to be very long, and where any play between the spindle and its bearing is greatly magnified at the lower end of the latter. In such service it has been entirely satisfactory and no evidence of wear or looseness between the spindle and its guide has developed even after months of hard and continuous service.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a drill press, the combination of a circular guide, a spindle slidably and snugly mounted in said guide, longitudinally disposed racks on diametrically opposite sides of said spindle, and pinions engaging said racks and operating to move the same longitudinally, said pinions being operatively connected together and being mounted to equalize the lateral thrust on said guide in the plane of said racks.

2. In a drill press, the combination of a circular guide, a spindle slidably and snugly mounted in said guide, longitudinally disposed racks on diametrically opposite sides of said spindle, and pinions engaging said racks and operating to move the same longitudinally, said pinions being mounted and driven to exert equal but opposed lateral forces on said racks and spindle.

Signed by me, this 23rd day of August, 1916.

GEORGE E. RANDLES.

Attested by—
M. MILLARD,
H. B. FAY.

Copies of this patent may be obtained for five cents each, by addressing the "Commissioner of Patents, Washington, D. C."